(12) United States Patent
Mikuni et al.

(10) Patent No.: US 10,901,168 B2
(45) Date of Patent: Jan. 26, 2021

(54) OPTICAL MEMBER FIXING STRUCTURE

(71) Applicant: MITSUBISHI ELECTRIC CORPORATION, Chiyoda-ku (JP)

(72) Inventors: Masatomo Mikuni, Chiyoda-ku (JP); Koji Kamiyama, Chiyoda-ku (JP); Yoshiyuki Kamo, Chiyoda-ku (JP); Keita Mochizuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 158 days.

(21) Appl. No.: 16/091,221

(22) PCT Filed: Mar. 6, 2017

(86) PCT No.: PCT/JP2017/008783
§ 371 (c)(1),
(2) Date: Oct. 4, 2018

(87) PCT Pub. No.: WO2017/199541
PCT Pub. Date: Nov. 23, 2017

(65) Prior Publication Data
US 2019/0154947 A1  May 23, 2019

(30) Foreign Application Priority Data

May 16, 2016 (JP) ................. 2016-097793

(51) Int. Cl.
*B32B 3/10* (2006.01)
*G02B 7/02* (2006.01)
(Continued)

(52) U.S. Cl.
CPC .......... *G02B 7/025* (2013.01); *G02B 6/4239* (2013.01); *G02B 7/00* (2013.01); *G02B 7/02* (2013.01);
(Continued)

(58) Field of Classification Search
None
See application file for complete search history.

(56) References Cited

U.S. PATENT DOCUMENTS 7,156,285 B2 *  1/2007  Sergey ................. B23K 20/008
                                                   156/272.2
2006/0114579 A1   6/2006  Shibuya et al.

FOREIGN PATENT DOCUMENTS

JP          2-23301 A       1/1990
JP       2006-119221 A      5/2006
(Continued)

OTHER PUBLICATIONS

International Search Report dated May 30, 2017 in PCT/JP2017/008783 filed on Mar. 6, 2017.

*Primary Examiner* — Seth Dumbris
(74) *Attorney, Agent, or Firm* — Xsensus LLP

(57) ABSTRACT

To achieve high positioning accuracy in an optical member fixing structure configured to bond an optical member, such as a lens, and a bonding object to each other with an adhesive layer, an optical member fixing structure in which a metal layer having a yield stress equal to or less than a curing shrinkage stress or a thermal stress of an adhesive forming an adhesive layer is formed on a bonding surface between at least one of an optical member or a bonding object and the adhesive layer to have a thickness of from 0.3% to 10% of a thickness of the adhesive layer after curing thereof.

18 Claims, 3 Drawing Sheets

(51) Int. Cl.
*G02B 7/00* (2006.01)
*G02B 6/42* (2006.01)
(52) U.S. Cl.
CPC .......... *G02B 6/4206* (2013.01); *G02B 6/4215* (2013.01); *G02B 6/4244* (2013.01); *Y10T 428/24917* (2015.01)

(56) References Cited

FOREIGN PATENT DOCUMENTS

| | | |
|---|---|---|
| JP | 2006-178388 A | 7/2006 |
| JP | 2009-36931 A | 2/2009 |
| JP | 2009-282340 A | 12/2009 |
| JP | 2011-118066 A | 6/2011 |
| WO | WO 2015/163026 A1 | 10/2015 |

* cited by examiner

OPTICAL MEMBER FIXING STRUCTURE

TECHNICAL FIELD

The present invention relates to an optical member fixing structure, and more particularly, to a structure for fixing an optical member, such as a lens.

BACKGROUND ART

When an optical member, such as a lens, is bonded and fixed to a bonding object with an adhesive, it has heretofore been functionally important that the shift of the optical axis be reduced. When the lens is fixed by bonding, its bonded portion is most liable to deform, and there is a high risk in that the deformation leads to the shift of the optical axis. Accordingly, the control of the deformation of the bonded portion leads to the reliability of a product, and hence a technology for improving the reliability of the bonding needs to be efficiently used.

In bonding, the performance of a surface treatment on a bonding surface for securing the reliability of the bonding is an important factor, and an approach involving exploiting the surface treatment has already been developed for bonding for optical applications. Of such approaches, the following approach has been known (see, for example, Patent Literature 1). At least one of the bonding surface of an optical member or the bonding surface of a fixing member is roughened, and hence a satisfactory bonding state can be maintained even under the fluctuation of a temperature or humidity environment. In addition, the optical axis shift of an optical element is reduced, and hence positioning accuracy is improved.

CITATION LIST

Patent Literature

[PTL 1] JP 2006-178388 A

SUMMARY OF INVENTION

Technical Problem

Such fixing structure can be expected to improve the reliability of the bonded portion, but its effect is limited from the viewpoint that the positioning accuracy of the member is held. That is, in such fixing structure, the viewpoint of a stress relaxation property is not sufficiently considered yet, and hence such accuracy that the positioning of the optical member as fine as 1 μm or less, which is required in association with the downsizing of a product and an improvement in performance thereof, can be surely secured cannot be expected.

The present invention has been made to solve such problem as described above, and an object of the present invention is to achieve high positioning accuracy in an optical member fixing structure configured to bond an optical member and a bonding object to each other with an adhesive layer.

Solution to Problem

In order to achieve the above-mentioned object, according to one embodiment of the present invention, there is provided an optical member fixing structure, which is configured to bond an optical member and a bonding object to each other with an adhesive layer, the optical member fixing structure including a metal layer having a yield stress equal to or less than a curing shrinkage stress of an adhesive forming the adhesive layer, the metal layer being formed on a bonding surface between at least one of the optical member or the bonding object and the adhesive layer so as to have a thickness of from 0.3% to 10% of a thickness of the adhesive layer after curing thereof.

In addition, in order to achieve the above-mentioned object, according to one embodiment of the present invention, there is provided an optical member fixing structure, which is configured to bond an optical member and a bonding object to each other with an adhesive layer, the optical member fixing structure including a metal layer having a yield stress equal to or less than a thermal stress of an adhesive forming the adhesive layer, the metal layer being formed on a bonding surface between at least one of the optical member or the bonding object and the adhesive layer so as to have a thickness of from 0.3% to 10% of a thickness of the adhesive layer after curing thereof.

Advantageous Effects of Invention

According to the optical member fixing structure of the present invention, the metal layer having a yield stress equal to or less than the curing shrinkage stress or thermal stress of the adhesive forming the adhesive layer is formed on the bonding surface between at least one of the optical member or the bonding object and the adhesive layer so as to have a thickness of from 0.3% to 10% of the thickness of the adhesive layer after the curing. Accordingly, the metal layer arranged on the bonding surface of the optical member, such as a lens, is yielded by the curing shrinkage stress or the thermal stress to absorb the deformation of the adhesive, and hence high positioning accuracy of the optical member can be achieved.

DESCRIPTION OF EMBODIMENTS

First Embodiment

Figure 1A:
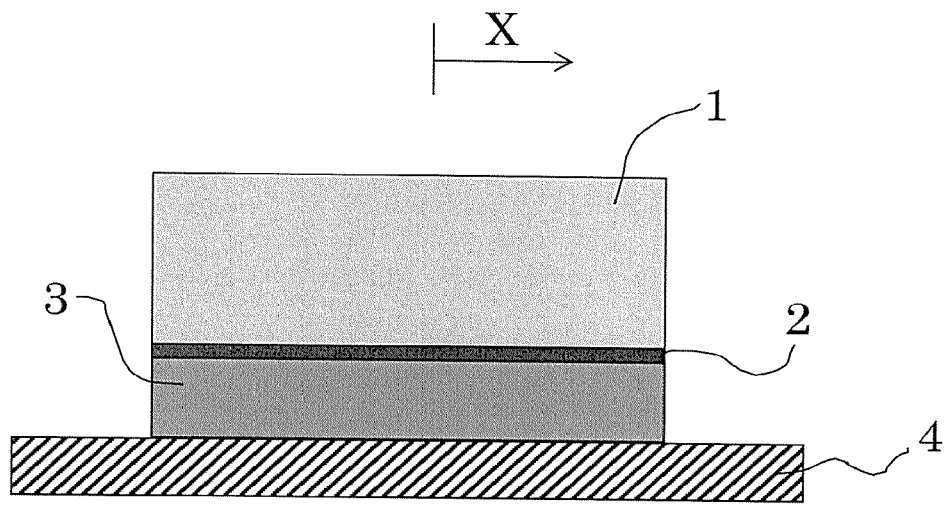
FIG. 1A is a vertical sectional view for illustrating an optical member fixing structure according to a first embodiment of the present invention, in particular, a sectional view for illustrating a fixing structure in which a metal layer 2 is formed on the entirety of only the bonding surface of an optical member.
Figure 1B:
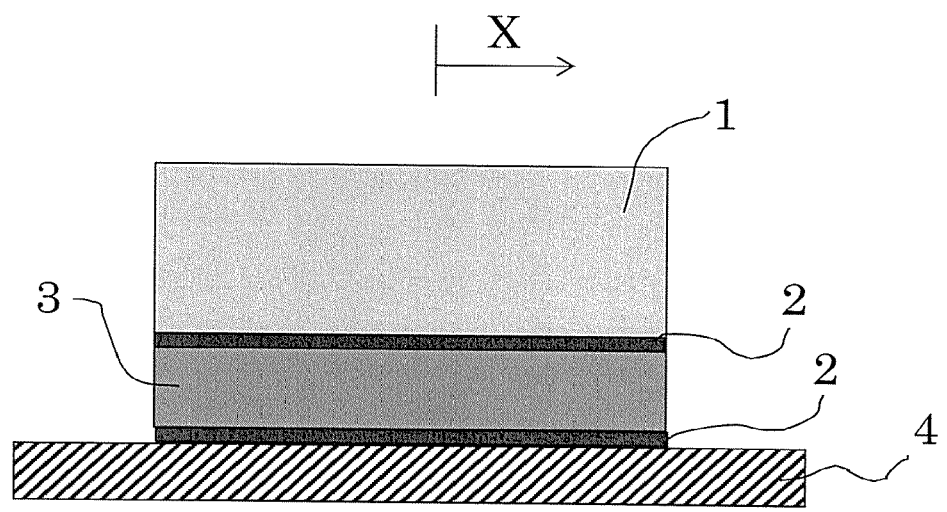
FIG. 1B is a vertical sectional view for illustrating the optical member fixing structure according to the first embodiment of the present invention, in particular, a sectional view for illustrating a fixing structure in which the metal layer 2 is formed on the entirety of each of both the bonding surfaces of the optical member and a bonding object.

FIG. 1A and FIG. 1B are each an illustration of a fixing structure for an optical member 1 in a first embodiment, and the optical member 1 and a bonding object (adherend) 4 are bonded and fixed to each other with an adhesive layer 3.

In this embodiment, a metal layer 2 having a yield stress equal to or less than the curing shrinkage stress or thermal stress of an adhesive forming the adhesive layer 3 is formed on the entirety of a bonding surface between at least one of the optical member 1 or the bonding object 4 and the adhesive layer 3 so as to have a thickness of from 0.3% to 10% of the thickness of the adhesive layer 3 after its curing.

First, in FIG. 1A, the metal layer 2 having a yield stress equal to or less than the curing shrinkage stress or thermal stress of the adhesive of the adhesive layer 3 is formed on the entirety of only a bonding surface between the optical member 1 and the adhesive layer 3 so as to have a thickness of from 0.3% to 10% of the thickness of the adhesive layer after the curing.

As described above, the metal layer 2 having a yield stress equal to or less than the curing shrinkage stress or thermal stress of the adhesive is formed. Accordingly, the positional shift of the optical member 1 resulting from the curing shrinkage stress at the time of the curing of the adhesive or from the thermal stress caused by the occurrence of a change in temperature in association with its usage environment can be suppressed by being absorbed by the yield stress of the metal layer 2, and hence high positioning accuracy can be achieved. In addition, the metal layer 2 also exhibits an effect on the shrinkage of the adhesive at the time of the use of a product, and hence long-term reliability can be expected.

In addition, the yielding of the metal layer 2 can alleviate the curing shrinkage stress or thermal stress of the adhesive. Accordingly, a satisfactory bonding state can be maintained even under the fluctuation of a temperature environment, and hence the high positioning accuracy of the optical member 1 can be further achieved.

The thickness of the metal layer 2 is 0.3% or more and 10% or less of a bonding thickness after the curing of the adhesive. When the thickness is less than 0.3% of the bonding thickness, a sufficient yield effect is not obtained, and hence the positioning accuracy is liable to reduce. When the thickness is more than 10% thereof, the stress is dispersed, and hence a sufficient yield effect is not obtained.

Next, the metal layer 2 is described in detail.

The metal layer 2 that can be yielded by the curing shrinkage stress or thermal stress of the adhesive is formed on the entirety of the bonding surface between at least one of the optical member 1 or the bonding object 4 according to this embodiment and the adhesive layer 3 so as to have a thickness of from 0.3% to 10% of the thickness of the adhesive layer after the curing.

The positional shift of the optical member resulting from the curing shrinkage stress at the time of the curing of the adhesive or from the thermal stress caused by the occurrence of the change in temperature in association with the usage environment can be suppressed by being absorbed by the yield stress of the metal layer 2, and hence the high positioning accuracy can be achieved.

When the metal layer 2 having a yield stress equal to or less than the curing shrinkage stress or thermal stress of the adhesive is formed on the bonding surface of at least one of the optical member 1 or the bonding object 4 so as to have a thickness of from 0.3% to 10% of the thickness of the adhesive layer after the curing as described above, the high positioning accuracy can be achieved. When the metal layer 2 is formed on each of both the bonding surfaces of the optical member 1 and the bonding object 4 as illustrated in FIG. 1B, the positional shift can be further suppressed, and hence the high positioning accuracy can be provided.

The thickness of the metal layer 2 is 0.3% or more and 10% or less of the bonding thickness after the curing of the adhesive. When the thickness is less than 0.3% of the bonding thickness, a sufficient yield effect is not obtained, and hence the positioning accuracy is liable to reduce. When the thickness is more than 10% thereof, the stress is dispersed, and hence a sufficient yield effect is not obtained.

A thickness-measuring method may be any one of an optical system and a contact system. Examples of the optical system include methods such as the observation of a section with a microscope and measurement with a light interference thickness meter. The contact system is, for example, an approach involving using a step gauge.

Although any approach may be used as long as the metal layer can be formed, a physical vapor phase film is desirable, and a film formed by vacuum deposition, ion plating, sputtering, or the like is suitable.

The metal layer 2 is desirably formed of a material having a yield stress of 10 MPa or more and 150 MPa or less. When a material having a yield stress of more than 150 MPa is used, the metal layer is not yielded by the curing shrinkage stress or thermal stress of the adhesive, and hence a sufficient suppressing effect on the positional shift is not obtained. In addition, when a material having a yield stress of 10 MPa or less is used, the metal layer is deformed by its creep deformation, and hence the long-term reliability cannot be secured.

Although any kind of metal may be used as long as the metal has a yield stress of 10 MPa or more and 150 MPa or less, aluminum, gold, tin, a tin alloy, and indium are given as examples. In order to determine a suitable yield stress, specifically, the yield phenomenon of a coating near a surface in contact with the adhesive only needs to be observed. A specific approach for the determination is, for example, a spherical nanoindentation method.

Second Embodiment

In the first embodiment described above, the metal layer 2 is formed on the entirety of the bonding surface. In this embodiment, however, the metal layer 2 is patterned.

Figure 2A:
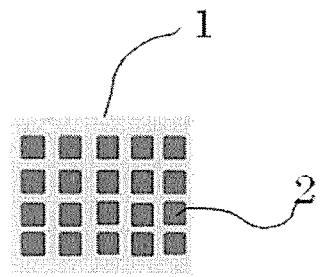
FIG. 2A is a plan view of a metal layer in an optical member fixing structure according to a second embodiment of the present invention when viewed from a bonding surface with an optical member or a bonding object, in particular, a plan view in which a pattern is formed into a dot shape.
Figure 2B:
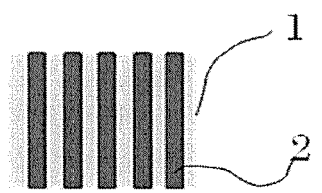
FIG. 2B is a plan view of the metal layer in the optical member fixing structure according to the second embodiment of the present invention when viewed from the bonding surface with the optical member or the bonding object, in particular, a plan view in which a pattern is formed into a stripe shape.

FIG. 2A and FIG. 2B are each an illustration of the formation pattern of the metal layer 2 when the optical member 1 is viewed from a side closer to the adhesive layer 3. Various patterns, for example, such a dot shape as illustrated in FIG. 2A and such a stripe shape as illustrated in FIG. 2B may be formed.

When any such pattern is formed, the degree of contribution of the yield stress of the metal layer 2 in the X-axis direction of each of FIG. 1A and FIG. 1B enlarges, and hence the deformation of the adhesive can be absorbed. Accordingly, the positional shift in the X-axis direction can be further suppressed.

In addition, when a UV-curable adhesive is used in the adhesive layer 3, at the time of the application of UV light from the upper surface of the optical member 1, the UV light is scattered by a gap of the pattern, and is hence efficiently applied to the adhesive. Accordingly, workability is improved, and hence insufficient curing of the adhesive can be prevented.

Further, when the pattern is formed, the surface area of the metal layer 2 increases. Accordingly, the adhesive easily wets and spreads on the bonding surface, and hence can be uniformly applied. Accordingly, a satisfactory bonding state can be maintained even under the fluctuation of, for example, a temperature or humidity environment, and hence the positioning accuracy of the optical member 1 can be improved.

Even when the pattern is formed, as long as the metal layer 2 is formed between one of the optical member 1 and the bonding object 4, and the adhesive layer 3 like the case of FIG. 1A, an improving effect on the positioning accuracy is exhibited.

In addition, when the metal layer 2 is formed between each of both the optical member 1 and the bonding object 4, and the adhesive layer 3 as illustrated in FIG. 1B, the high positioning accuracy of the optical member 1 can be further achieved. Accordingly, the formation of the patterns on both the bonding surfaces can further suppress the positional shift of the optical member 1, and hence can achieve the high positioning accuracy.

Further, when the metal layer 2 is formed on each of both the optical member 1 and the bonding object 4, and a pattern is formed, the pattern may be formed in at least one of the metal layers formed on the bonding surfaces of the optical member 1 and the bonding object 4.

In addition, the thickness of the metal layer 2 is desirably 0.3% or more and 10% or less of the bonding thickness after the curing of the adhesive. When the thickness is less than 0.3% of the bonding thickness, a sufficient yield effect is not obtained, and hence the positioning accuracy is liable to reduce. Meanwhile, when the thickness is more than 10% thereof, the stress is dispersed, and hence a sufficient yield effect is not obtained. In addition, it becomes difficult to uniformly apply the adhesive at the time of its application. As a result, a satisfactory bonding state cannot be maintained, and hence the positioning accuracy is liable to reduce.

When the pattern is formed, the metal layer 2 desirably accounts for 30% or more and 90% or less of the area of the bonding surface of the optical member 1 or the bonding object 4. When the metal layer accounts for less than 30% of the area, a sufficient yield effect is not obtained, and hence the positioning accuracy is liable to reduce. When the metal layer accounts for more than 90% thereof, an effect of the pattern formation is not obtained.

With regard to a method of forming the pattern, the pattern may be formed after the formation of the metal layer 2 on the entirety of the bonding surface, or the metal layer 2 may be formed into a pattern shape from the beginning before being bonded. Although any one of the methods may be used as long as the pattern can be formed, a pattern formation method based on, for example, etching or laser irradiation is available as the former method involving forming the pattern after the formation of the metal layer 2. With regard to the latter method involving forming the metal layer 2 of the pattern shape from the beginning, the metal layer 2 only needs to be formed by the formation method described in [0020] after the bonding surface of the optical member 1 or the bonding object 4 has been subjected to, for example, the masking of the pattern shape.

Here, a light-transmitting member, such as an optical lens or an optical waveguide, a semiconductor laser (LD), a photodiode (PD), or the like may be used as the optical member 1.

In addition, the bonding object 4 is formed of: a metal, such as an iron (Fe)-nickel (Ni)-cobalt (Co) alloy, an Fe—Ni alloy, a stainless steel (SUS)-copper (Cu)-tungsten (W) alloy, or a Cu-molybdenum (Mo) sintered material; a ceramic, such as an alumina ($Al_2O_3$) sintered body, an aluminum nitride (AlN) sintered body, or a mullite ($3Al_2O_3 \cdot 2SiO_2$) sintered body; a resin; or the like. When the bonding object is formed of a metal, the ingot of the metal is subjected to, for example, a conventionally known metal processing method, such as rolling or punching, or injection molding and cutting to be formed into a predetermined shape. The bonding object 4 may be formed into various shapes, such as a quadrangular flat plate shape (rectangular parallelopiped shape) and a disc shape.

When the bonding object 4 is formed of a ceramic or a resin, a metal coating may be bonded to the surface of the bonding object 4. For example, when the bonding object 4 is formed of a ceramic, a metal coating formed of, for example, W, Mo, or manganese (Mn) is bonded and formed by a conventionally known metallizing method.

Figure 3:
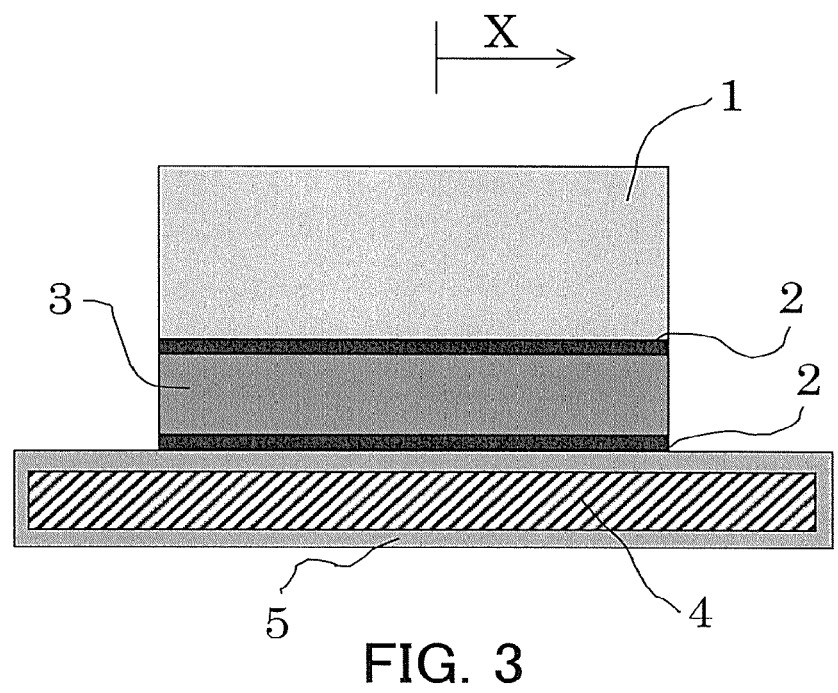
FIG. 3 is a vertical sectional view when a protective metal layer is arranged on the bonding object in each of the optical member fixing structures according to the first embodiment and second embodiment of the present invention.

In addition, as illustrated in FIG. 3, a protective metal layer 5 excellent in corrosion resistance made of gold (Au), nickel, or the like may be further bonded to the surface of the bonding object 4, and the construction can suppress the corrosion of the entirety of the surface of the bonding object 4.

Third Embodiment

Figure 4:
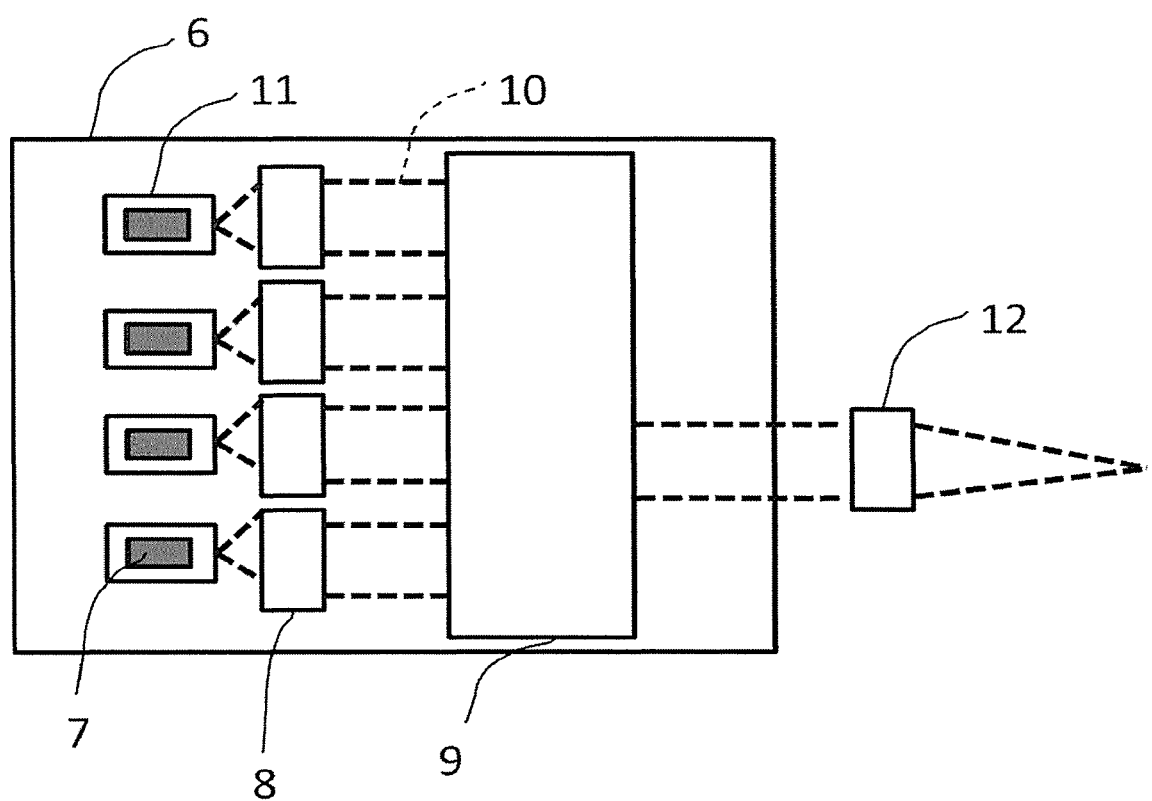
FIG. 4 is a block diagram for illustrating an example of an optical communication module to which an optical member fixing structure according to a third embodiment of the present invention is applicable.

FIG. 4 is an illustration of an example of an optical communication module to which the present invention is applicable. The optical communication module includes, for example, four semiconductor laser light sources 7, four collimating lenses 8, a substrate 6, a multiplexer 9, and a condensing lens 12.

The semiconductor laser light sources 7 are each joined onto a submount 11 with solder or the like, and the submounts 11 are joined onto the substrate 6 with solder or the like. The submounts 11 are each formed of aluminum nitride (AlN), aluminum oxide ($Al_2O_3$), or the like.

The collimating lenses 8 are bonded to the substrate 6, and convert light beams output from the semiconductor laser light sources 7 into parallel light beams 10. The light beams converted into the parallel light beams 10 are collected at one site by the multiplexer 9, and are coupled by the condensing lens 12.

Here, a metal, such as an iron (Fe)-nickel (Ni)-cobalt (Co) alloy, an Fe—Ni alloy, a stainless steel (SUS)-copper (Cu)-tungsten (W) alloy, or a Cu-molybdenum (Mo) sintered material, is desirable as the substrate 6.

The collimating lenses 8 serving as optical members each correspond to the optical member 1 in each of the first embodiment and the second embodiment, and the substrate 6 corresponds to the bonding object 4 in each of the first embodiment and the second embodiment. The metal layer 2 having a yield stress equal to or less than the curing shrinkage stress or thermal stress of the adhesive of the adhesive layer 3 is formed on the entirety of the bonding surface of at least one of the collimating lenses 8 or the substrate 6 with the adhesive layer 3 so as to have a thickness of from 0.3% to 10% of the thickness of the adhesive layer after its curing like each of FIG. 1A and FIG. 1B.

In addition, the positional shift of the optical member resulting from the curing shrinkage stress at the time of the curing of the adhesive or from the thermal stress caused by the occurrence of a change in temperature of the adhesive in association with its usage environment can be suppressed by being absorbed by the yield stress of the metal layer 2, and hence high positioning accuracy can be achieved and a reduction in coupling efficiency of the light beams to be coupled by the condensing lens 12 can be suppressed.

Further, when any one of various patterns, for example, such a dot shape as illustrated in FIG. 2A and such a stripe shape as illustrated in FIG. 2B is formed in the metal layer on the bonding surface of at least one of the collimating lenses 8 or the substrate 6 with the adhesive layer 3 as illustrated in each of FIG. 2A and FIG. 2B, the degree of contribution of the yield stress of the metal layer 2 in the X-axis direction of each of FIG. 1A and FIG. 1B enlarges. Thus, the deformation of the adhesive can be absorbed, and hence the positional shift in the X-axis direction can be further suppressed and the reduction in coupling efficiency can be suppressed.

In addition, when a UV-curable adhesive is used in the adhesive layer 3, at the time of the application of UV light from the upper surface of each of the collimating lenses 8, the UV light is scattered by a gap of the pattern, and is hence efficiently applied to the adhesive. Accordingly, workability is improved, and hence insufficient curing of the adhesive can be prevented.

Further, when the pattern is formed, the surface area of the metal layer 2 increases. Accordingly, the adhesive easily wets and spreads on the bonding surface, and hence can be uniformly applied. Accordingly, a satisfactory bonding state can be maintained even under the fluctuation of, for example, a temperature or humidity environment, and hence the positioning accuracy of each of the collimating lenses 8 can be improved and the reduction in coupling efficiency can be suppressed.

Preliminary Experiment

Preliminary Experiment 1

Preliminary Experiment 1 is the measurement of the yield stress of the formed metal layer 2. An optical lens (measuring 0.6 mm by 1.0 mm by 1.0 mm) was used as the optical member 1, and a copper (Cu)-tungsten (W) alloy plated with nickel was used as the bonding object 4. In this example, a film formed from aluminum, indium, nickel, or gallium by a vacuum deposition method is described as the metal layer 2.

The optical lens 1 or the bonding object 4 was loaded into a vacuum chamber, and was heated at a degree of vacuum of $1\times10^{-5}$ Pa and a preheating temperature of 150° C. for 30 minutes before vapor deposition, followed by sputtering to clean its surface. After that, the vapor deposition was performed by using an aluminum target at a degree of vacuum of $4\times10^{-4}$ Pa and 150° C. When a pattern is formed, as described above, a method involving forming the pattern after the film formation, a method involving forming the pattern at the time of the film formation, or the like is available. This time, the pattern was formed by performing the vapor deposition after a vapor deposition object surface had been covered with a mesh made of stainless steel (wire diameter: 0.55 mm, aperture: 0.077 mm) The results of thickness measurement with a step gauge showed that the thicknesses of metal layers were 0.5 μm, 2.0 μm, and 8.0 μm.

The typical stresses of the metal layers and the typical strains thereof based on a Tabor model were determined by a spherical nanoindentation method. An ultramicro indentation hardness tester ENT-1100a manufactured by Elionix Inc. was used, and a diamond spherical indenter having a radius of curvature of 20 pin was used as an indenter. A load was sequentially increased from 0.1 mN to 100 mN in 28 stages, and the point at which the slope of a typical stress-typical strain curve deviated from a straight line was measured as a yield stress. The results are shown below.
Aluminum: yield stress of 120 MPa
Indium: yield stress of 10.5 MPa
Nickel: yield stress of 240 MPa
Gallium: yield stress of 9 MPa Preliminary Experiment 2

Preliminary Experiment 2 is the measurement of the curing shrinkage stress of an adhesive. Black and white sprays were applied to the surface of a 10-millimeter square SS400 plate to form contrast. An epoxy-based UV-curable adhesive (manufactured by Kyoritsu Chemical & Co., Ltd., 9210) was applied and bonded to the SS400 plate, and was irradiated with UV light to be cured. The UV irradiation was performed under the condition of 20 mW/cm$^2$ (wavelength: 365 nm) for 30 seconds. Photographs of the adhesive before the curing and after the curing were taken, and were subjected to image analysis with ARAMIS system manufactured by GOM, followed by the calculation of the curing shrinkage stress of the adhesive from its strain. The result is shown below.
Curing shrinkage stress: 180 MPa Therefore, as described above, when the metal layer 2 is aluminum, its yield stress is found to be 120 MPa, which is considerably smaller than the curing shrinkage stress of the adhesive layer 3, that is, 180 MPa.

Preliminary Experiment 3

Preliminary Experiment 3 is the measurement of the thermal stress of an adhesive. Black and white sprays were applied to the surface of a 10-millimeter square SS400 plate to form contrast. An epoxy-based UV-curable adhesive (manufactured by Kyoritsu Chemical & Co., Ltd., 9210) was applied and bonded to the SS400 plate, and was irradiated with UV light to be cured.

The UV irradiation was performed at 20 mW/cm$^2$ (wavelength: 365 nm) for 30 seconds. After the curing, the temperature was increased from 23° C. to 100° C. Its photographs when the temperature was 23° C. and when the temperature was 100° C. were taken, and were subjected to image analysis with ARAMIS system manufactured by GOM, followed by the calculation of the thermal stress from its strain. The result is shown below.
Thermal stress: 150 MPa Therefore, as described above, when the metal layer 2 is aluminum, its yield stress is found to be 120 MPa, which is considerably smaller than the thermal stress, that is, 150 MPa.

Example 1

The result of the following evaluation is described: a lens serving as the optical member 1 (hereinafter sometimes referred to as, for example, "lens 1") and the bonding object 4 were bonded to each other, and the positional shift of the lens 1 was evaluated from the shift of the light spot of laser light that had passed the lens 1. An epoxy-based UV-curable adhesive (manufactured by Kyoritsu Chemical & Co., Ltd., 9210) was used as the adhesive of the adhesive layer 3.

The lens 1 was gripped, and the adhesive was applied to its bonding surface. After that, the lens was bonded to the bonding object 4, and the adhesive was irradiated with UV light to be cured. The UV irradiation was performed at 20 mW/cm² (wavelength: 365 nm) for 30 seconds. The positional shift of the lens 1 was evaluated by converting a change in position of the light spot of the laser light that had passed the lens after the UV irradiation as compared to that before the UV irradiation into the amount of positional shift of the lens 1. The observation of a section of the adhesive with a microscope showed that its bonding thickness after the curing was 70 µM.

After the bonding, aging was performed at 100° C. for 4 hours for initial stability, such as the degassing of the adhesive. A durability evaluation was performed by using the sample. The aging may be performed at a temperature in the range of from about 60° C. to about 150° C. for a time period in the range of from about several minutes to about several days to the extent that the heat resistance of a product and the economical efficiency of its production are allowed.

<Evaluation>

The sample was subjected to a heat cycle test in which its temperature was held at 85° C. for 30 minutes and then at 20° C. for 30 minutes 200 times. 20 Samples were evaluated by using the following indicators: the positional shift of the optical member was 1.5 µm or less, 1 µm or less, or 0.5 µm or less. In the evaluation, a case in which no samples exceeded those indicators was indicated by Symbol "○", and a case in which some of the samples exceeded those indicators was indicated by Symbol "x". The results of the evaluation of aluminum, indium, nickel, and gallium are shown in Table 1 below.

In Table 1 above, the samples onto each of which aluminum or indium had been deposited from the vapor were defined as Examples 1 to 16, the sample onto which none of these metals had been deposited from the vapor was defined as Comparative Example 1, and the samples onto each of which nickel or gallium had been deposited from the vapor were defined as Comparative Examples 2 to 10.

In the case of aluminum or indium, as shown in each of Examples 1 to 16, the positional shift was able to be suppressed to less than 1.5 µm by performing the vapor deposition onto one of the lens 1 and the bonding object 4. In addition, as shown in each of Examples 1, 2, 4, 9, 10, and 12, the positional shift was able to be further reduced by performing the vapor deposition onto each of both the lens 1 and the bonding object 4.

In addition, in a sample in which a pattern was formed in each of both the lens 1 and the bonding object 4, the amount of positional shift was able to be reduced to the largest extent, and hence a positional shift of 0.5 µm or less was able to be achieved. Accordingly, the formation of the pattern was able to achieve higher positioning accuracy.

Meanwhile, as shown in Comparative Example 1, when the metal layer 2 is absent, the positional shift of the optical member 1 is found to be 1.5 µm or more.

When nickel having a large yield stress or gallium having a small yield stress was used, as shown in each of Comparative Examples 2 to 10, the amount of positional shift of any sample was 1.5 µm or more.

In addition, the results of a positional shift evaluation when the thickness of aluminum was changed are shown in Table 2 below.

TABLE 1

| Kind of metal | Vapor deposition onto lens | Vapor deposition thickness | Patterning | Vapor deposition onto bonding object | Vapor deposition thickness | Patterning | Positional shift of optical member 1.5 µm or less | 1.0 µm or less | 0.5 µm or less | |
|---|---|---|---|---|---|---|---|---|---|---|
| Aluminum | Present | 0.5 µm | Present | Present | 0.5 µm | Present | ○ | ○ | ○ | Example 1 |
| | | | | | | Absent | ○ | ○ | x | Example 2 |
| | | | | Absent | | — | ○ | x | x | Example 3 |
| | Present | | Absent | Present | | Present | ○ | ○ | x | Example 4 |
| | | | | | | Absent | ○ | x | x | Example 5 |
| | | | | Absent | | — | ○ | x | x | Example 6 |
| | Absent | | — | Present | | Present | ○ | ○ | x | Example 7 |
| | | | | | | Absent | ○ | x | x | Example 8 |
| | | | | Absent | | — | x | x | x | Comparative Example 1 |
| Indium | Present | | Present | Present | | Present | ○ | ○ | ○ | Example 9 |
| | | | | | | Absent | ○ | ○ | x | Example 10 |
| | | | | Absent | | — | ○ | x | x | Example 11 |
| | Present | | Absent | Present | | Present | ○ | ○ | x | Example 12 |
| | | | | | | Absent | ○ | x | x | Example 13 |
| | | | | Absent | | — | ○ | x | x | Example 14 |
| | Absent | | — | Present | | Present | ○ | ○ | x | Example 15 |
| | | | | | | Absent | ○ | x | x | Example 16 |
| Nickel | Present | | Present | Present | | Present | x | x | x | Comparative Example 2 |
| | | | | | | Absent | x | x | x | Comparative Example 3 |
| | | | | Absent | | — | x | x | x | Comparative Example 4 |
| | Present | | Absent | Present | | Present | x | x | x | Comparative Example 5 |
| | | | | | | Absent | x | x | x | Comparative Example 6 |
| | | | | Absent | | — | x | x | x | Comparative Example 7 |
| | Absent | | — | Present | | Present | x | x | x | Comparative Example 8 |
| | | | | | | Absent | x | x | x | Comparative Example 9 |
| Gallium | Present | | Present | Present | | Present | x | x | x | Comparative Example 10 |

TABLE 2

| Kind of metal | Vapor deposition onto collimating lens | Patterning | Vapor deposition onto bonding object | Patterning | Thickness | 1.5 μm or less | 1.0 μm or less | 0.5 μm or less | |
|---|---|---|---|---|---|---|---|---|---|
| Aluminum | Present | Present | Present | Present | 0.2 μm | x | x | x | Comparative Example 11 |
|  |  |  |  |  | 0.5 μm | o | o | o | Example 1 |
|  |  |  |  |  | 2.0 μm | o | o | o | Example 17 |
|  |  |  |  |  | 8.0 μm | x | x | x | Comparative Example 12 |

The sample in which the thickness was 0.5 μm was defined as Example 1, the sample in which the thickness was 2.0 μm was defined as Example 17, and the samples in which the thicknesses were 0.2 μm and 8.0 μm were defined as Comparative Examples 11 and 12, respectively. When the thicknesses were 0.5 μm and 2.0 μm, as shown in each of Examples 1 and 17, the amount of positional shift was able to be suppressed to less than 0.5 μm. When the thickness was 0.2 μm, as shown in Comparative Example 11, the amount of positional shift was 1.5 μm or more. This is probably because the ratio of the thickness to the bonding thickness after the curing was 0.3% or less, and hence a sufficient yield effect was not obtained. Also when the thickness was 8.0 μM, as shown in Comparative Example 12, the amount of positional shift was 1.5 μm or more. This is probably because the ratio of the thickness to the bonding thickness after the curing was 10% or more, and hence the stress was dispersed and a sufficient yield effect was not obtained. The following is also considered to be a cause for the foregoing: it became difficult to uniformly apply the adhesive at the time of its application, with the result that a satisfactory bonding state could not be maintained, and hence the positioning accuracy became liable to reduce.

With regard to gold or tin, a similar effect may be obtained because while aluminum has a Vickers hardness serving as an indicator of hardness of 25 Hv, gold and tin have Vickers hardnesses of 26 Hv and 8 Hv, respectively, and hence their hardnesses are equal to or lower than that of aluminum. In addition, with regard to tin alloys (e.g., Pb-5Sn, Sn-0.75Cu, and Sn-5Sb), similar effects may be obtained because their Vickers hardnesses are 12.0 Hv, 12.9 Hv, and 17.1 Hv, respectively.

Example 2

The module of FIG. 4 was produced, and its light coupling efficiency was measured. An epoxy-based UV-curable adhesive (manufactured by Kyoritsu Chemical & Co., Ltd., 9210) was used as the adhesive of the adhesive layer 3.

The collimating lenses 8 were gripped, and the adhesive was applied to its bonding surface. After that, the lenses were bonded to the substrate 6, and the adhesive was irradiated with UV light to be cured. The UV irradiation was performed at 20 mW/cm² (wavelength: 365 nm) for 30 seconds. The observation of a section of the adhesive with a microscope showed that its bonding thickness after the curing was 70 μm.

After the bonding, aging was performed at 100° C. for 4 hours for initial stability, such as the degassing of the adhesive. A durability evaluation was performed by using the sample. The aging may be performed at a temperature in the range of from about 60° C. to about 150° C. for a time period in the range of from about several minutes to about several days to the extent that the heat resistance of a product and the economical efficiency of its production are allowed.

The sample was subjected to a heat cycle test in which its temperature was held at 85° C. for 30 minutes and then at 20° C. for 30 minutes 200 times. 20 Samples were evaluated by using a change in coupling output as an indicator. In the evaluation, a change in coupling output of less than 0.5 dB was indicated by Symbol "o", and a change in coupling output of 0.5 dB or more was indicated by Symbol "x". The results of the evaluation are shown in Table 3 below.

TABLE 3

| Kind of metal | Vapor deposition onto collimating lens | Patterning | Vapor deposition onto bonding object | Patterning | Thickness | Whether or not change in coupling output is less than 0.5 dB | |
|---|---|---|---|---|---|---|---|
| Aluminum | Present | Present | Present | Present | 0.5 μm | o | Example 18 |
|  | Absent | Absent | Absent | — |  | x | Comparative Example 13 |

In Table 3 above, the sample onto which aluminum had been deposited from the vapor was defined as Example 18, and the sample onto which no metal had been deposited from the vapor was defined as Comparative Example 13.

In the sample onto which aluminum had been deposited from the vapor, the change in coupling efficiency was able to be suppressed to less than 0.5 dB, and hence its effect as a module was able to be confirmed.

In such bonded body of dissimilar materials, the thermal stress or curing shrinkage stress contributes to the positional shift of a member. However, when such a coating having a yield stress equal to or less than a certain value as used in an embodiment of the present invention is present at an interface between the materials, minute deformation caused by partial yield stresses of the materials occurs near the surface of the coating. Accordingly, from the viewpoint of the entire positional shift of the lens, it is assumed that an influence of the stress hardly becomes apparent.

In order to express such effect, the coating itself needs to have a considerable yield stress. From the viewpoint of anticorrosion, a gold layer is generally formed. However, from the viewpoint of the positional shift, a metal species having a small deformation amount and a large yield stress, such as nickel, is generally used. The inventors of the present invention have made extensive investigations, and as a result, have found that a metal species that is relatively soft and is in a state of having a yield stress of 10 MPa or more and 150 MPa or less is exploited. Although a certain effect is exhibited merely by bonding the coating, the accuracy can be further improved by adding a twist to the status of the formation of the coating for further improving the effect.

In addition, when the pattern is formed, the degree of contribution of the yield stress of the metal layer 2 in the X-axis direction of each of FIG. 1A and FIG. 1B enlarges, and hence the deformation of the adhesive can be absorbed. Accordingly, the positional shift in the X-axis direction can be further suppressed. The positional shift of the lens can be controlled by using those approaches in accordance with accuracy required of a product.

REFERENCE SIGNS LIST

1 optical member, 2 metal layer, 3 adhesive layer, 4 bonding object, 5 protective metal layer, 6 substrate, 7 semiconductor laser, 8 collimating lens, 9 multiplexer, 10 parallel light beam, 11 submount, 12 condensing lens

The invention claimed is:

1. An optical member fixing structure, which is configured to bond an optical member including an optical element having an optical axis and a bonding object to each other with an adhesive layer, the optical member fixing structure comprising:
a metal layer having a yield stress equal to or less than curing shrinkage stress of an adhesive forming the adhesive layer, the metal layer being formed on a bonding surface between at least one of the optical member or the bonding object and the adhesive layer to have a thickness of from 0.3% to 10% of a thickness of the adhesive layer after curing thereof,
wherein the metal layer is formed into a dot shape or a stripe shape, and has a yield stress of 10 MPa or more and 150 MPa or less.

2. An optical member fixing structure according to claim 1, wherein the metal layer is formed to account for 30% or more and 90% or less of an area of the bonding surface.

3. An optical member fixing structure according to claim 1, rein the metal layer is formed by aluminum vapor deposition or indium vapor deposition.

4. An optical member fixing structure according to claim 1, wherein the adhesive layer includes a UV-curable adhesive.

5. An optical member fixing structure according to claim 1, wherein the metal layer is formed on at least one of a bonding surface of the adhesive layer with a collimating lens serving as the optical member or a bonding surface of the adhesive layer with a substrate serving as the bonding object.

6. An optical member fixing structure, which is configured to bond an optical member including an optical element having an optical axis and a bonding object to each other with an adhesive layer, the optical member fixing structure comprising:
a metal layer having a yield stress equal to or less than a thermal stress of an adhesive forming the adhesive layer, the metal layer being formed on a bonding surface between at least one of the optical member or the bonding object and the adhesive layer to have a thickness of from 0.3% to 10% of a thickness of the adhesive layer after curing thereof,
wherein the metal layer is formed into a dot shape or a stripe shape, and has a yield stress of 10 MPa or more and 150 MPa or less.

7. An optical member fixing structure according to claim 6, wherein the metal layer is formed to account for 30% or more and 90% or less of an area of the bonding surface.

8. An optical member fixing structure according to claim 6, wherein the metal layer is formed by aluminum vapor deposition or indium vapor deposition.

9. An optical member fixing structure according to claim 6, wherein the adhesive layer includes a UV-curable adhesive.

10. An optical member fixing structure according to claim 6, wherein the metal layer is formed on at least one of a bonding surface of the adhesive layer with a collimating lens serving as the optical member or a bonding surface of the adhesive layer with a substrate serving as the bonding object.

11. An optical member fixing structure according to claim 1, wherein:
the bonding object includes at least one of metal, ceramic, and resin.

12. An optical member fixing structure according to claim 6, wherein:
the bonding object includes at least one of metal, ceramic, and resin.

13. A device, comprising:
an optical member including an optical element having an optical axis;
a bonding object;
a fixing structure to bond the optical member to the bonding object, the fixing structure including:
a metal layer having a yield stress equal to or less than a curing shrinkage stress of an adhesive forming an adhesive layer, the metal layer being formed on a bonding surface between at least one of the optical member or the bonding object and the adhesive layer to have a thickness of from 0.3% to 10% of a thickness of the adhesive layer after curing thereof,
wherein the metal layer is formed into a dot shape or a stripe shape, and has a yield stress of 10 MPa or more and 150 MPa or less.

14. The device according to claim 13, wherein the metal layer is formed to account for 30% or more and 90% or less of an area of the bonding surface.

15. The device according to claim 13, wherein the metal layer is formed by aluminum vapor deposition or indium vapor deposition.

16. The device according to claim 13, wherein the adhesive layer includes a UV-curable adhesive.

17. The device according to claim 13, wherein:
the device is an optical communication module, and
the metal layer is formed on at least one of a bonding surface of the adhesive layer with a collimating lens serving as the optical member or a bonding surface of the adhesive layer with a substrate serving as the bonding object.

18. The device according to claim 13, wherein:
the bonding object includes at least one of metal, ceramic, and resin.

* * * * *